United States Patent
Grooters

(12) 
(10) Patent No.: US 6,389,487 B1
(45) Date of Patent: *May 14, 2002

(54) CONTROL OF VIDEO DEVICE BY MULTIPLEXING ACCESSES AMONG MULTIPLE APPLICATIONS REQUESTING ACCESS BASED ON VISIBILITY ON SINGLE DISPLAY AND VIA SYSTEM OF WINDOW VISIBILITY RULES

(75) Inventor: Brandon A. Grooters, Bedford, TX (US)

(73) Assignee: Gateway, Inc., North Sioux City, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/931,450

(22) Filed: Aug. 16, 2001

Related U.S. Application Data

(63) Continuation of application No. 09/021,361, filed on Feb. 10, 1998.

(51) Int. Cl.[7] .................. G06F 13/00; G06F 12/00; G06F 3/00; G09G 5/00; G09G 5/34

(52) U.S. Cl. ................. 710/51; 710/36; 710/41; 710/200; 709/100; 709/104; 709/107; 709/108; 709/204; 345/113; 345/114; 345/115; 345/118; 345/119; 345/120; 345/339; 345/340; 345/343; 345/344; 345/345; 340/825.06; 348/552

(58) Field of Search ................. 710/20, 21, 36, 710/51, 107, 29, 41, 200; 709/100, 104, 107, 108, 204; 345/113, 119, 120, 114, 115, 118, 339, 340, 343, 344, 345; 340/825.06; 348/552

(56) References Cited

U.S. PATENT DOCUMENTS

| | | | | | |
|---|---|---|---|---|---|
| 5,442,749 | A | * | 8/1995 | Northcutt et al. | 709/219 |
| 5,522,025 | A | * | 5/1996 | Rosenstein | 345/807 |
| 5,872,922 | A | * | 2/1999 | Hogan et al. | 709/204 |
| 6,067,624 | A | * | 5/2000 | Kuno | 713/202 |
| 6,122,005 | A | * | 9/2000 | Sasaki et al. | 348/211 |
| 6,133,941 | A | * | 10/2000 | Ono | 348/15 |
| 6,212,541 | B1 | * | 4/2001 | McAuliffe et al. | 709/100 |
| 6,239,836 | B1 | * | 5/2001 | Suzuki et al. | 348/211 |

* cited by examiner

Primary Examiner—Thomas Lee
Assistant Examiner—Tanh Q Nguyen
(74) Attorney, Agent, or Firm—Joseph H. Lee

(57) ABSTRACT

A method and apparatus for allowing several applications to share a single video overlay resource via multiplexing are disclosed. The multiplexing is accomplished from the application end through a multiplexing abstraction layer provided to the developers of end applications as an application program interface. Through the application program interface, each applications may, at any time, request, release, or modify the attributes of the video overlay device such as picture quality, tuning, source, etc. The application program interface provides all basic functionality of the hardware as accessible through other means including normal operating system support and device driver services.

33 Claims, 7 Drawing Sheets

CONTROL OF VIDEO DEVICE BY MULTIPLEXING ACCESSES AMONG MULTIPLE APPLICATIONS REQUESTING ACCESS BASED ON VISIBILITY ON SINGLE DISPLAY AND VIA SYSTEM OF WINDOW VISIBILITY RULES

CROSS-REFERENCE TO RELATED APPLICATIONS

The present invention claims priority under 35 USC §120, as a continuation, to U.S. patent application Ser. No. 09/021,361, filed Feb. 10, 1998, which is herein incorporated by reference in its entirety.

BACKGROUND OF THE INVENTION

The present invention generally relates to the field of computer controlled video devices and more particularly to a video multiplexer for allowing multiple applications to simultaneously share and control a single video device.

It is known in the art to simultaneously combine video signals from multiple sources onto a single display device. As a result a user may be provided with access to more than one process being displayed at a time, each typically within a portion of the display, referred to as a window. However, each process associated with a window views the physical hardware as if though it were the only process controlling the device because the video hardware exists as an individual device. Present technologies for video overlay device drivers and operating system support do not allow for multiple applications to share the video resource on the system. The video overlay device drivers that are in existence today do not allow for the application sharing of the video resource. Current video device drivers (VxDs) and software architectures for typical computer implemented video systems do not allow for more than a single application or thread to access the video device at any given time. The reason for this is the physical hardware of the device exists as a single instance in the machine. It would therefore be highly desirable to allow programmers developing software for the video system to be able to bypass the one application, one device restriction.

SUMMARY OF THE INVENTION

Accordingly, it is a goal of this invention to provide a video device multiplexing scheme which allows multiple applications to share a live video device or video overlay resource. The invention may also be directed to any device operated in conjunction with an information handling system.

The present invention is directed to an information handling system for controlling a video device wherein the information handling system in one embodiment includes an adapter operatively coupled to the video device for providing access to the video device to one or more applications executable by the information handling system, and a multiplexer for multiplexing control of the video device among the multiple applications when multiple applications request access to the video device.

The present invention is further directed to, in an information handling system, a method for controlling a video device wherein the method includes in one embodiment of the invention the steps of providing access to the video device to one or more applications executable by the information handling system and multiplexing control of the video device among the multiple applications when multiple applications request access to the video device.

The present invention is additionally directed to a computer readable medium, tangibly embodying a program of instructions executable by a computer or information handling system to perform the steps for controlling a video device, wherein the steps include in one embodiment of the invention providing access to the video device to one or more applications executable by the information handling system, and multiplexing control of the video device among the multiple applications when multiple applications requesting access to the video device.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1:
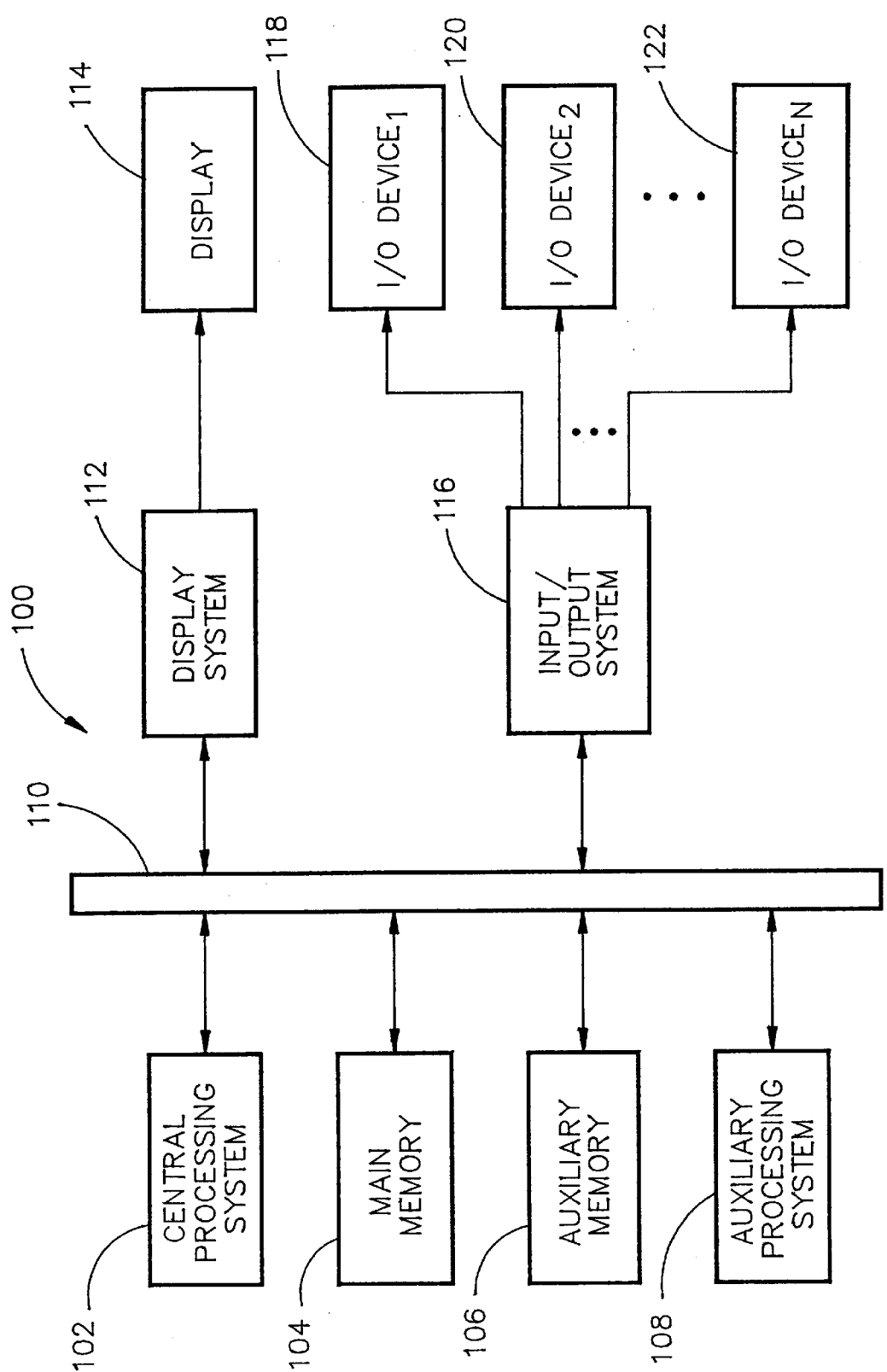
FIG. 1 is a block diagram of a hardware system in accordance with the present invention.

Referring now to FIG. 1, a hardware system in accordance with the present invention is shown. The hardware system shown in FIG. 1 is generally representative of the hardware architecture of a computer-based information handling system of the present invention. A central processing system 102 controls the hardware system 100. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

Other components of the hardware system 100 include main memory 104, auxiliary memory 106, and an auxiliary processing system 108 as required. The main memory 104 provides storage of instructions and data for programs executing on the central processing system 102. The main memory 104 is typically semiconductor based memory such as dynamic random access memory (DRAM) and or static random access memory (SRAM). The auxiliary memory 106 provides storage of instructions and data that are loaded into the main memory 104 before execution. The auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The hardware system 100 further includes a display system 112 for connecting to a display device 114, and an input/output (I/O) system 116 for connecting to one or more I/O devices 118, 120 up to N number of I/O devices 122. The display system 112 may comprise a video display adapter having all of the components for driving the display device, including video random access memory (VRAM), buffer, and graphics engine as desired. The display device 114 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 116 may comprise one or more controllers or adapters for providing interface functions between the one or more I/O devices 118–122. For example, the input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 116 and I/O devices 118–122 may provide or receive analog or digital signals for communication between the hardware system 100 of the present invention and external devices, networks, or information sources. The input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

Figure 2:
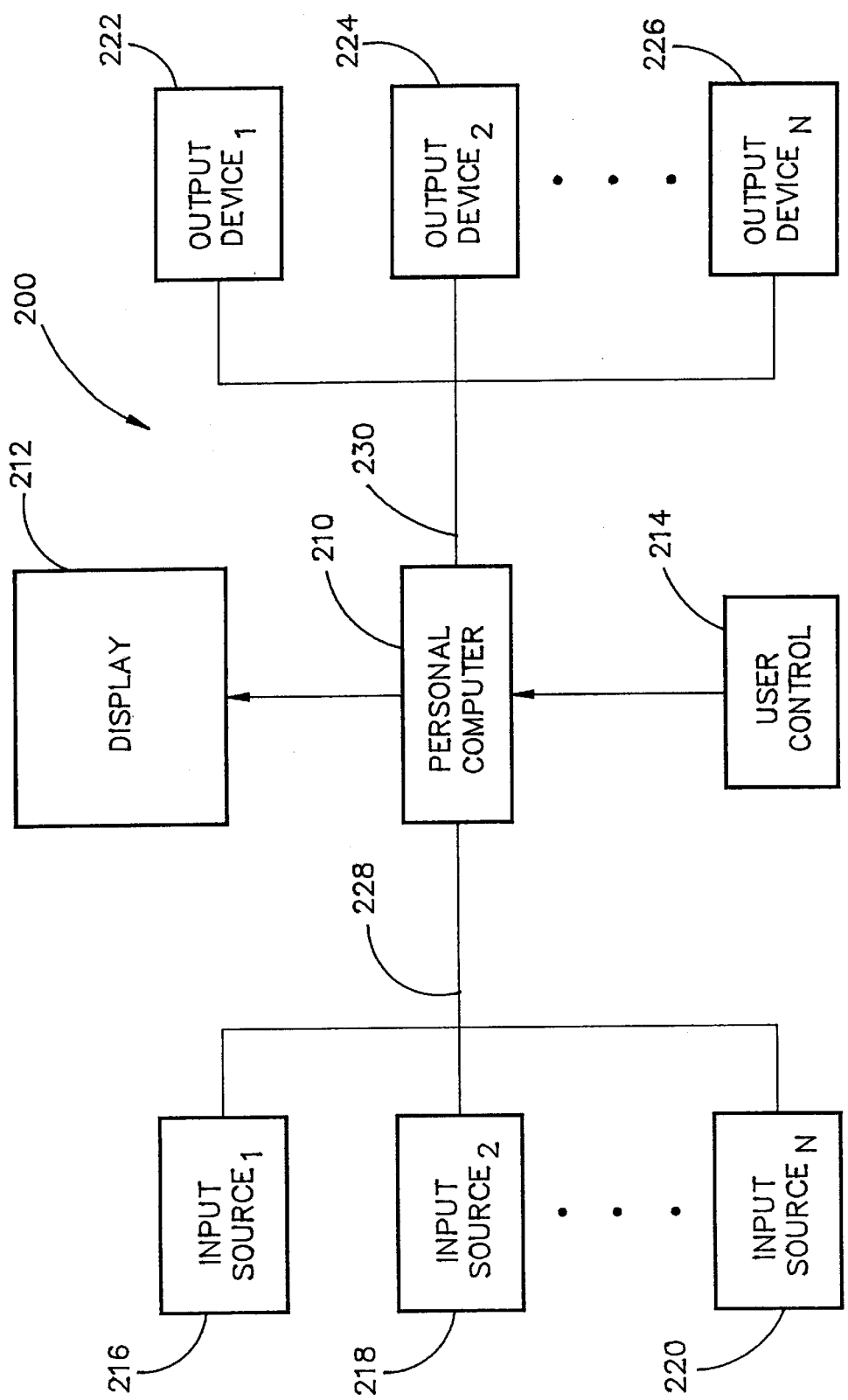
FIG. 2 is an illustration of an integrated television and personal computer convergence device in accordance with the present invention.

Referring now to FIG. 2, an integrated television and personal computer convergence device is shown. A personal computer and television convergence device is the preferred application of the present invention. However, the present invention may be utilized with any computer-controlled device. The convergence device 200, also referred to as a PC-TV, comprises a personal computer 210 as a central control device. Video information is displayed on a display device 212 which is preferably a high resolution (VGA or greater) computer type cathode ray tube (CRT) monitor. Alternatively, the display 212 may comprise a flat screen display such as an active matrix, supertwisted nematic liquid-crystal display (LCD) or plasma based display. The personal computer 210 receives one or more input signals from one or more input sources such as input sources 216, 218 and 220. Likewise, the personal computer provides one or more output signals to one or more output devices such as output devices 222, 224 and 226. One of ordinary skill would appreciate that a single peripheral device may simultaneously function as an input source and as an output device thereby providing bi-directional data communications. For example, a modem may be operatively connected to the personal computer 210 and function as an input source and an output device by both sending and receiving signals to and from a remotely disposed computer connected to the personal computer 210 via the modem.

A user of the convergence PC-TV device 200 may control the PC-TV via a user control device 214 that operatively communicates with the personal computer 210. For example, the user control device 214 may be a hand-held remote control device similar to a standard television remote control using infrared data communications. Alternative wireless communications technologies may also be utilized such as radio-frequency (RF) communications. The convergence PC-TV device 200 may be a home entertainment system combining a complex processor with a high quality display as described in U.S. Pat. No. 5,675,390. Said U.S. Pat. No. 5,675,390 is hereby incorporated by reference in its entirety. Further, the user control device 214 may be an adjustable power remote control drive as described in U.S. Pat. No. 5,650,831. Said U.S. Pat. No. 5,650,831 is hereby incorporated by reference in its entirety.

Figure 3:
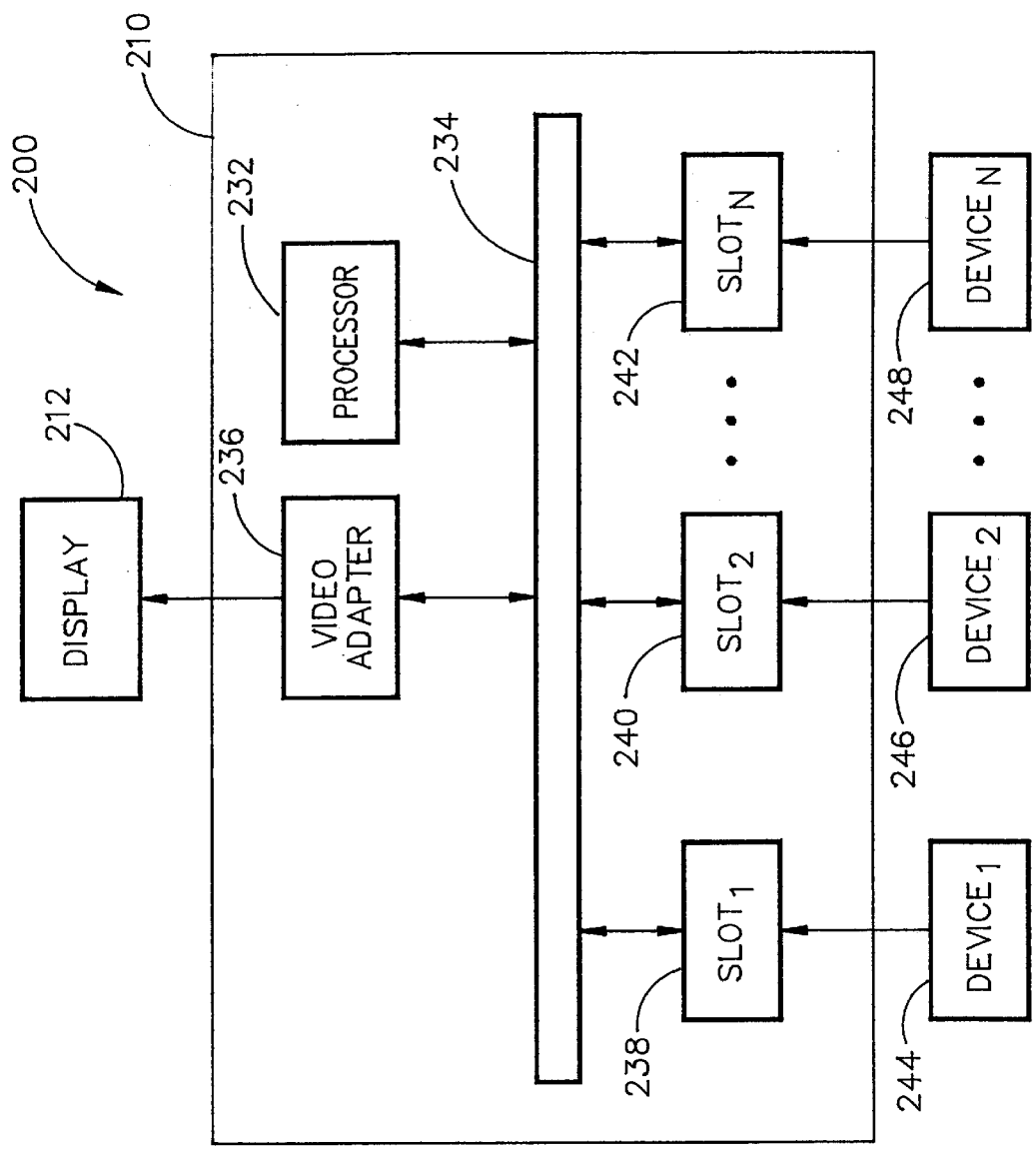
FIG. 3 is an illustration of a somewhat more detailed schematic of the personal computer and television convergence device of FIG. 1.

Referring now to FIG. 3, a somewhat more detailed schematic of the PC-TV convergence device 200 of FIG. 2 is shown. At the heart of the PC-TV convergence device lies the personal computer 210 which typically comprises a central bus 234 through which the internal components of the computer are interconnected. For example, the central processor 232 connects through the bus 234 to communicate with and control the video adapter 236 which in turn controls the display device 212. Further, the bus interconnects with expansion slots 238, 240 and 242 to provide connectivity between devices 244, 246 and 248 and other components via bus 234.

Figure 4:
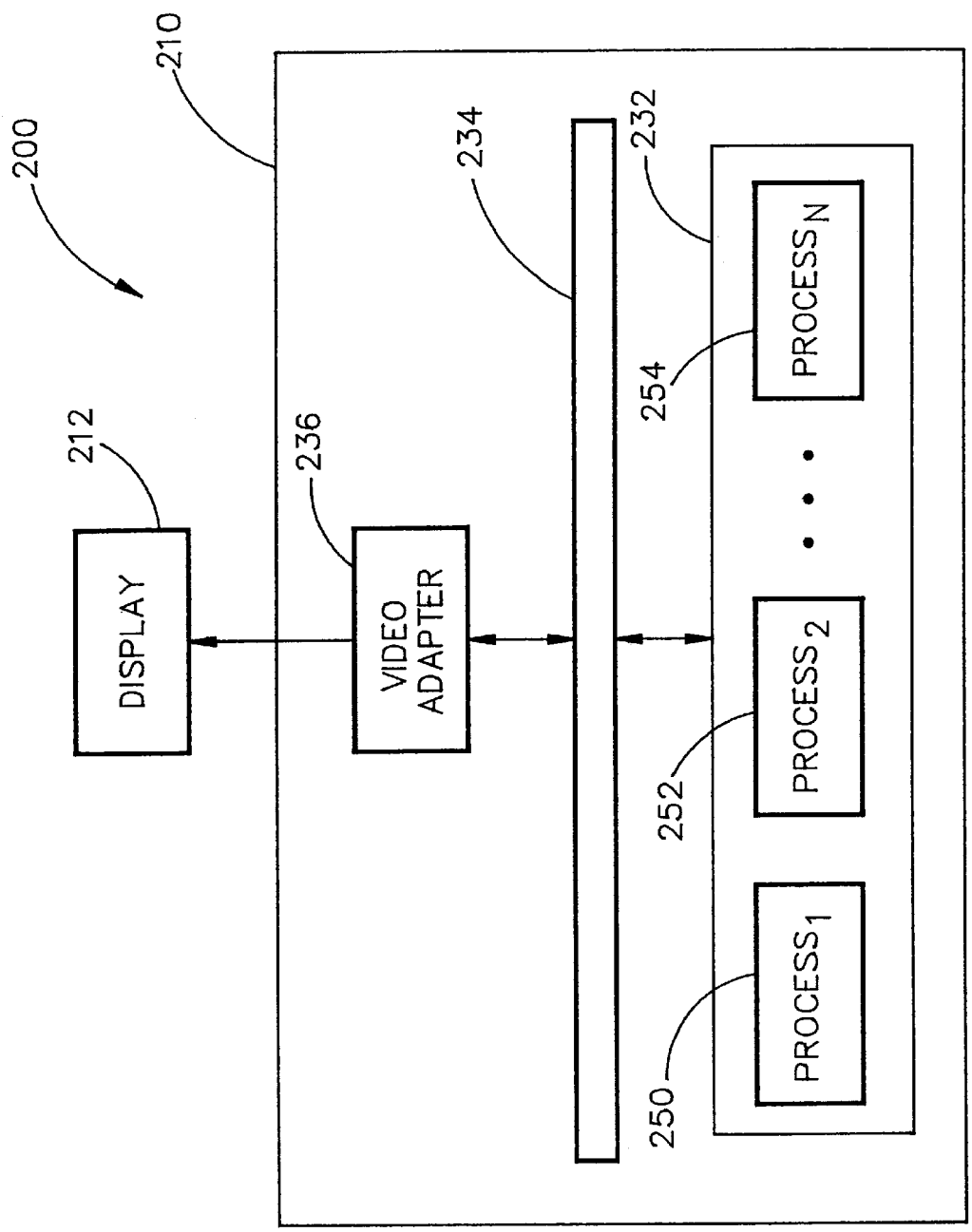
FIG. 4 is a diagram of a personal computer and television convergence device of the present invention.

Referring now to FIG. 4, a diagram of the PC-TV convergence device of the present invention is shown. The processor 232 connects to bus 234 to control peripheral devices such as display 212 through control of the video adapter 236. The processor may control the running of one or more processes 250, 252 and 254 simultaneously. Each of the processes 250, 252 and 254 may at some point require control of the video display device 212 simultaneously, in succession, or in an interleaved succession wherein one or more processes may need to intermittently access the display 212 during the period which another process has control of the video display 212.

Figure 5:
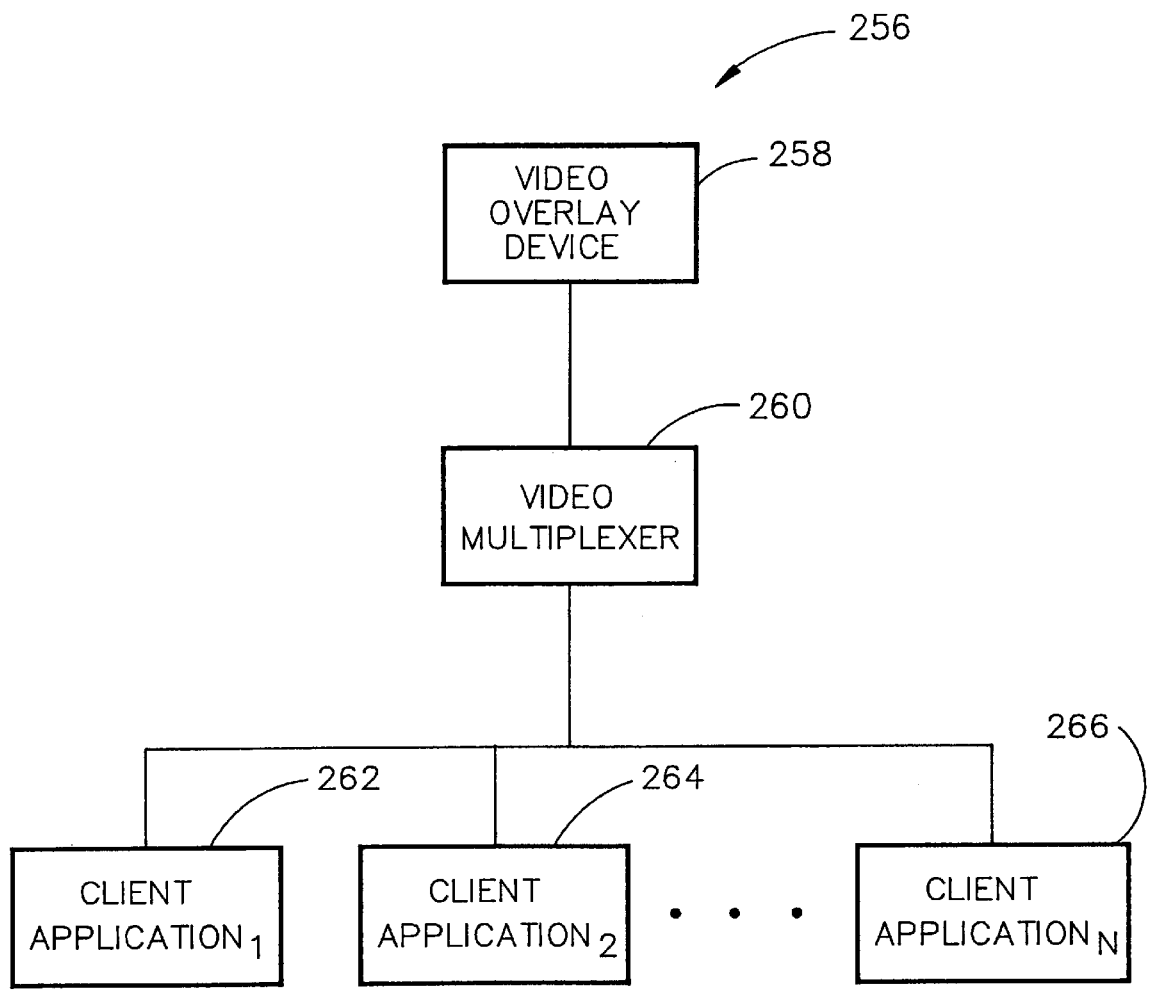
FIG. 5 is a diagram of a video multiplexing scheme of the present invention.

Referring now to FIG. 5, a diagram of a video multiplexing scheme of the present invention is shown. The multiplexing scheme 256 illustrates the control of a single hardware video overlay device 258 by one or several client applications 262, 264 and 266. Video multiplexer or manager 260 provides control and management of the video overlay device 258 with multiple client applications 260.

The scheme 256 is utilized to control the video overlay device 258 which may be combined with a number of various video devices each sharing access to the single video device 258. Such a scheme may be utilized in a personal computer or similar type of electronic device. The video overlay device 258 is controlled through a video multiplexer 260 which controls the access to the video overlay device by one or more client video applications 262, 264 and 266. The video multiplexer 260 functions as a video device manager by interfacing the client applications with the video device 258.

The video device resource multiplexer 258 as shown in FIG. 5 allows multiple client applications to simultaneously share and control a live video device such as an overlay device combined with television tuner cards or digital video disk (DVD) drives, etc. Sharing may be accomplished through a system of soft-locks and window visibility rules which are described as follows. Whenever an application (262–266) is visible to the user, i.e. visible on display 114 of FIG. 1, the application will be permitted to access video device 258. When the application is no longer visible to the user, for example when its window is minimized, the application will relinquish access to video device 258 to another application that is visible. Any time an application (262–266) requests access to video overlay device 258, under normal conditions it will receive it, removing any existing video from the application which previously had access to video device 258. If a requesting application is not visible to the user, i.e. not shown on display 114, a request to access video device 258 will fail until such time that the requesting application is visible in a window on display 114.

Further, video device multiplexer 260 maintains state information on each of its clients, so that when a client application requests and receives the video device, the parameters which control the video attributes are reset to their original condition before the aforementioned application lost the video device to another requesting process. These attributes may be requested and saved in temporary or permanent storage by a client application so that the application can restore the attributes following a shutdown or process termination.

The first step in the management process includes registering a client application with the client manager by placing the client application on a list that is internal to the client manager. The handle of the client application is passed to the client window during the registration process. Video may then be placed in the window of the client application. Upon completion of registration, the video client is free to request, release and alter the video for its client window. The client application may be identified on subsequent calls.

A client application is unregistered by the video manager by removing the client from the video manager's internal list. Upon unregistration, the client application is no longer permitted to use the video manager services.

When a new calling client application requesting access to the video device, any client making the call must be visible (i.e. have an open and displayed window), and the current client application will lose the video overlay device to the new calling client application. The video manager maintains a pointer from calling client application to the losing client in order to establish control of the video device in the event that the new calling client releases control of the video device at a subsequent time. The video manager carries out all necessary calls to close the video overlay in the losing client application and to open the device in the calling client.

In restoring the state of video for the calling client, if the calling client is a new client then default system values for video state information are utilized. When the new client releases the video overlay device before an additional new client takes control of the video device, the video manager returns the video overlay device to the previous client prior to the present client as indicated by the pointer that was established when the new client application was called. The saved state information of the previous client is restored from memory and set for that client which then takes control of the video device. In the event that no previous client application exists then the video overlay device is placed into a standby mode until a new client application is registered and the new client requests the video overlay device.

The video multiplexer comprises two parts: the video server (video multiplexer) and the video client (client application). As a stand alone application the video server is implemented as an out of process component object model (COM) server. The video client, which is used by any application wishing to display video, is implemented as an in process component object model (COM) server or dynamic link library (DLL). A component object model (COM) is a specification for building software components that can be assembled into programs or add functionality to existing programs running on an operating system capable of displaying windows. Component object model components can be written in a variety of programming languages, typically C++, and can be unplugged from a program at run time without having to recompile the program. Component object model is a foundation of the object linking and embedding (OLE) specification. Object linking and embedding refers to the transferring and sharing of information, or objects, among multiple applications.

The video manager framework consists of typical component object model architecture implementations. Within this framework is the necessary implementation code to handle multiple video clients running on the same system. The video manager is completely thread safe. This is necessary to allow multiple video clients residing in different processes safe access to the methods of the video manager. The video manager utilizes a linked list and a concept of "soft locks" to manage the video clients.

The following subroutines may be utilized in the management process of the video overlay device. The principle implementation methods of the video server are explained, and the syntax of these calls has been simplified for clarity.

RegisterClient(HANDLE) This method allows a video client to register itself with the video manager. The effect of registering a client is that it is placed in the internal client list of the manager. The HANDLE to the client's window is passed during the registration process. This is used to both place the video in the window and to identify a particular client on subsequent calls. Once the registration method is complete, the video client is free to request, release and alter the video for its client window.

UnregisterClient(HANDLE) This method has the effect of removing the calling client from the video manager's internal client list. Once this call is made, the calling client is no longer permitted to use the video manager services. This is a termination, or "clean-up" call.

RequestVideo(HANDLE) A client uses this call to request the video for the calling client. The video manager implementation of this method includes several key concepts. First, any client making this call must be visible. Second, the current client will lose the video overlay device to the client making this call. Third, internally the video manager must maintain a pointer from the client making the call to the client losing the video. The implementation of this method is designed so that each of the previously mentioned concepts is handled. Also, depending on the architecture of the video overlay applications programming interface (API), all necessary calls to close the video overlay device in the client losing the video, and opening the device in the client making the call, are carried out in this method (or methods directly called by this method). In addition, the state of the video is restored for the client making the call. If the client that is making the call is a new video client, default system values are utilized for video state information.

ReleaseVideo(HANDLE) A client calls this method when it no longer desires to have the video displayed in its window. In the processing of this call, the video manager will return the video overlay device to the video client which previously had the video, prior to this client requesting it. This information is saved in the RequestVideo( ) call. Again, as in RequestVideo( ), all state information is restored to the client which receives the video as the client making this call is releasing it. If no previous client exists, the video manager will put the video overlay device, and its own internal management code into a "sleep" or standby mode until such a time that a new video client is registered and requests the video device.

All of the previously listed methods are called from client to server through typical component object model mechanisms (e.g., connection points, etc.). The video client architecture is similar to that of the video manager and is also implemented as a component object model component, and has all of the necessary framework code to support component object model and component object model communications to the video manager. The video client methods are the actual applications programming interface (API) to the programmer who wishes to utilize the functionality of the video device multiplexer. The exposed methods, or API, of the video client are identical to the methods listed for the video manager, this provides the programmers with an exposed interface for managing the video in their window. In addition to these methods the video client must also perform a number of internal operations which simplify the use of the video client from a programmer's standpoint.

Internally the video client tracks the position of the window in which it is implemented. This allows the video overlay device to automatically be placed properly in the window. This frees the programmer implementing the control from having to do this. The implementation of this functionality consists of a window sub-classing method that allows the video client component to receive the client window messages as they are produced.

The video multiplexer system also uses normal window messages to inform the client applications of certain key events such as the client losing the video signal to another client. This functionality will allow the clients to respond to events such as this in a timely and effective manner.

Figure 6:
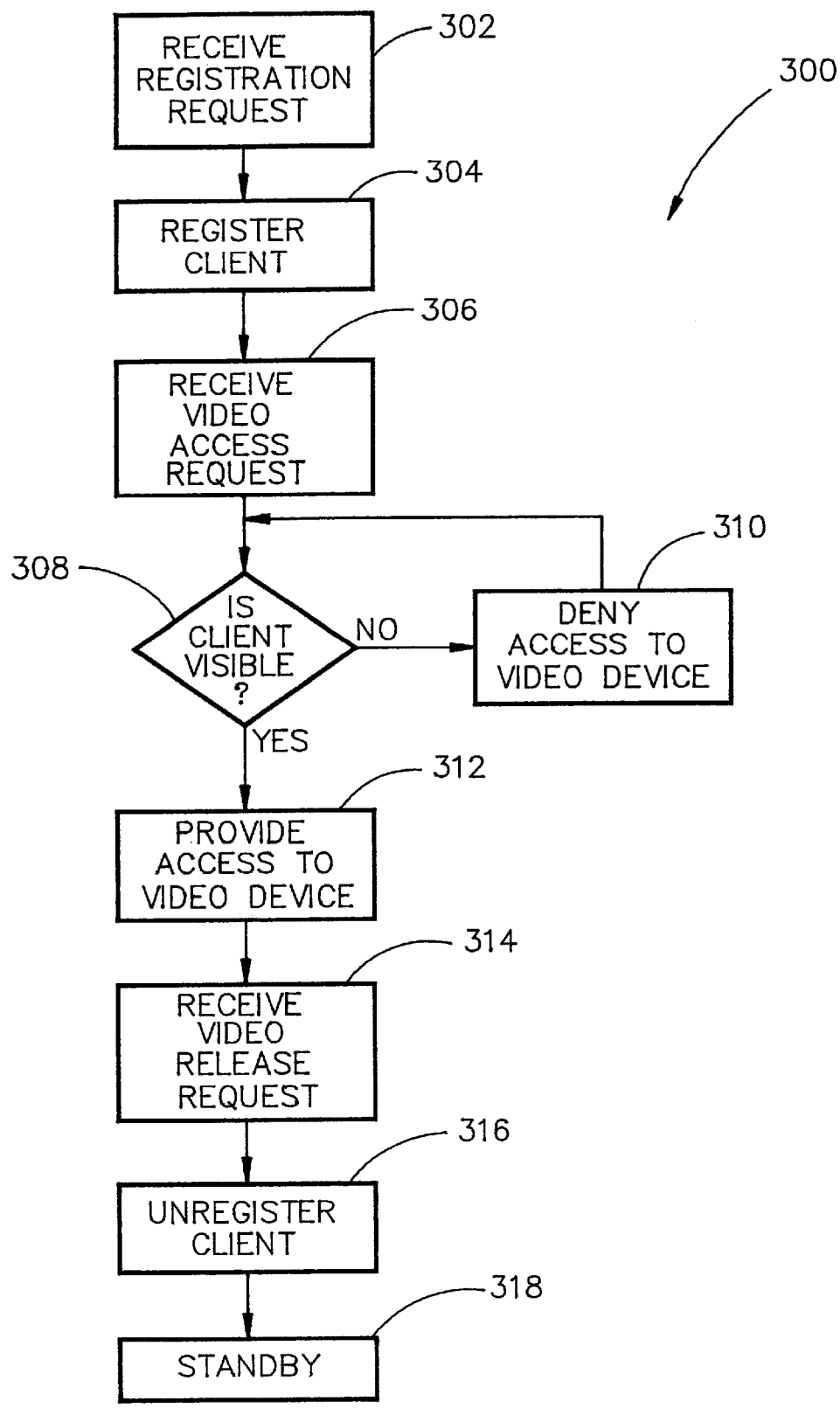
FIGS. 6 and 7 are flow diagrams of exemplary video device multiplexing and management processes.
Figure 7:
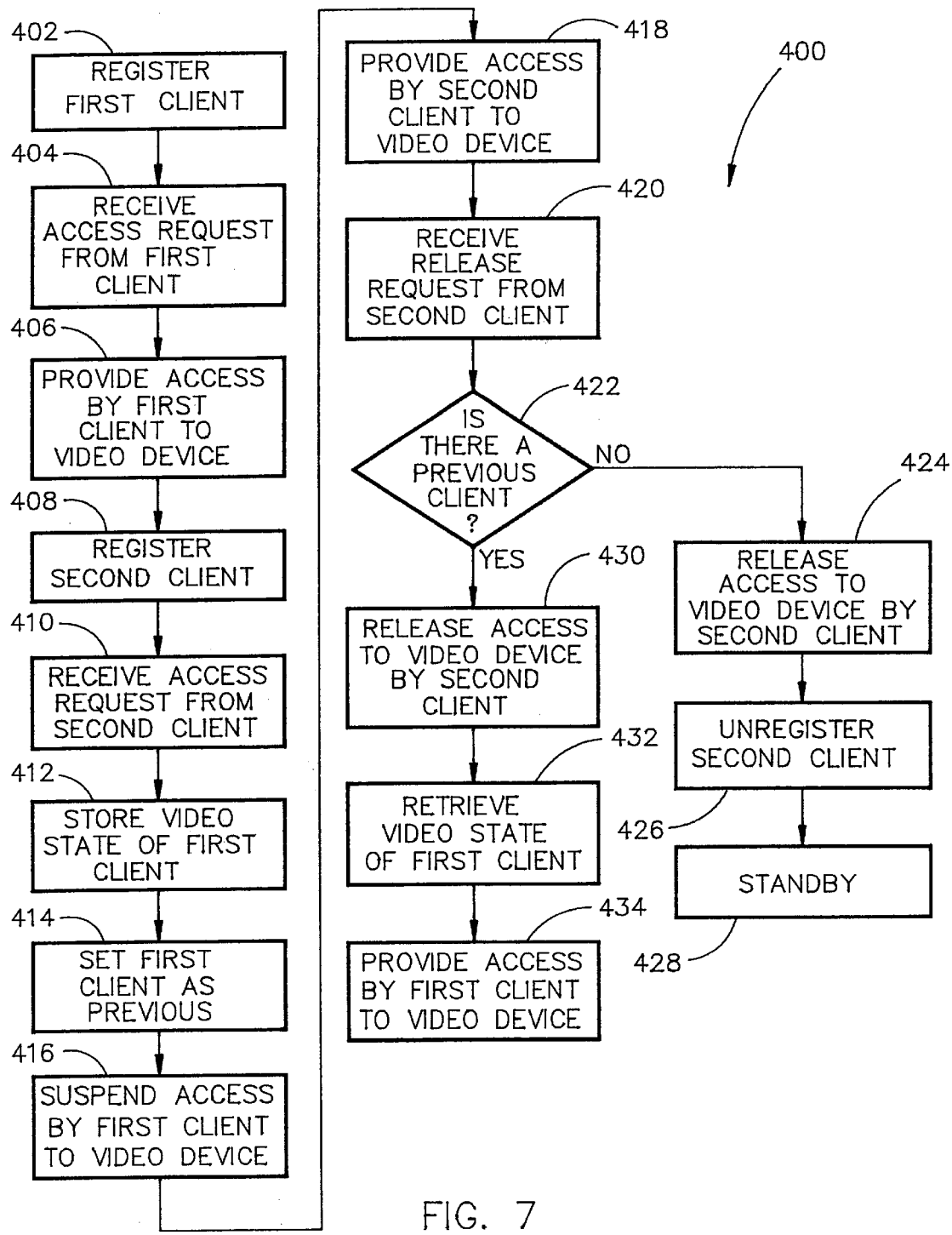

Referring now to FIGS. 6 and 7, exemplary video device multiplexing and management processes are illustrated. In the process 300 shown in FIG. 6, the video multiplexer receives a registration request from a client application at step 302. The video multiplexer then registers the client application at step 304. After registration of the client application the video multiplexer receives a request to access the video device at 306. Using visibility rules as described with respect to FIG. 5, the video multiplexer determines whether or not the client application is visible at step 308. If the client application is not visible, then access to the video device is denied at step 310 until the client application becomes visible. Upon the client being visible the video multiplexer provides access to the video device by the client application at 312. After completion of the video task, the video multiplexer receives a video release request from the client application at step 314. After release of the client application the video multiplexer unregisters the client application at step 316, and thereby the client application may no longer access and control the device until it again registers with the video multiplexer. Since there is no other registered client application available to request access to the video device, the video device is placed into a standby mode at step 318.

In the process 400 shown in FIG. 7, the video multiplexer receives a registration request from a first client application at step 402. After registration, a request to access the video device may be received from the first client at step 404, upon which the video multiplexer provides access to the video device by the first client at step 406. At step 408, a request to receive a second client application is received. After registration, the video device multiplexer receives a request to access the video device from the second client application at step 410 at which point the first client application has control of the video device. Upon receiving the request from the second client application, the video multiplexer stores the video state of the first client application and sets a pointer to the first client as the previous client application at step 414. At step 416, access by the first client application to the video device is suspended, and the video multiplexer provides to the video device by the second client application at point 418.

After completion of the task, the second client application sends a video release request which is received by the video multiplexer at step 420. A determination is made whether a previous video client exists to which access to the video device may be restored at step 422. If no previous client exists, such as if the first client application becomes unregistered during the time which the second client application has access to the video device, then the second client application is released from access to the video device at step 424. The second client application then is unregistered at step 426 and the video device is placed into a standby mode at step 428.

If a previous client application does exist as indicated by the previous client application pointer, then the second client application is released from access to the video device at step 430. The video state of the first client application is retrieved at step 432. The video multiplexer provides access to the video device by the first client application at step 434. The first client application will continue to have access to the video device until a second application again takes control or until the first application releases control of the device.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the live video device resource multiplexer of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. In an information handling system, a method for controlling a video device, comprising:
    providing access in a multi-window environment to the video device to one or more applications executable by the information handling system, wherein each application of the one or more applications has a corresponding window displayable on a single display device of the information handling system; and
    upon multiple applications of the one or more applications requesting access to the video device, multiplexing access to the video device among the multiple applications via a system of window visibility rules based on the corresponding windows as displayed on the single display device of the information handling system.

2. The method as claimed in claim 1, wherein the window visibility rules include when a window corresponding to a requesting application is visible on the single display device, the requesting application is provided access to the video device.

3. The method as claimed in claim 1, wherein the window visibility rules include when a window corresponding to a requesting application is not visible on the single display device, the requesting application is denied access to the video device.

4. The method as claimed in claim 1, further comprising the step of registering an application prior to said providing step.

5. The method as claimed in claim 4, further comprising the steps of:
    determining whether an application is registered prior to said providing step upon receiving a request from the application to access the video device; and
    denying access to the video device by the application if the application is not registered.

6. The method as claimed in claim 4, further comprising the step of unregistering the registered application upon receiving a release request from the registered application.

7. The method as claimed in claim 1, further comprising the steps of:
    maintaining a pointer to a previous application upon a subsequent application obtaining access to the video device; and
    restoring access to the video device to the previous application upon the subsequent application relinquishing access to the video device.

8. In an information handling system, a method for controlling a video device with a video device manager, comprising:
    receiving a request by an application to access the video device, wherein a window corresponding to the application is displayable in a multi-window environment on a single display device of the information handling system;
    denying access to the video device by the application if a window corresponding to the application is not visible on the single display device of the information handling system; and
    providing access to the video device by the application via a system of window visibility rules if a window corresponding to the application is visible on the single display device of the information handling system.

9. The method as claimed in claim 8, wherein said denying access step includes denying access to the video device by the application until the window corresponding to the application is visible on the single display device.

10. The method as claimed in claim 8, further comprising the step of registering an application prior to said providing step.

11. The method as claimed in claim 10, further comprising the steps of:
    determining whether an application is registered prior to said providing step upon receiving a request from the application to access the video device; and
    denying access to the video device by the application if the application is not registered.

12. The method as claimed in claim 10, further comprising the step of unregistering the registered application upon receiving a release request from the registered application.

13. The method as claimed in claim 8, further comprising the steps of:
    maintaining a pointer to a previous application upon a subsequent application obtaining access to the video device; and
    restoring access to the video to the previous application upon the subsequent application relinquishing access to the video device.

14. In an information handling system, a method for controlling a video device with a video device manager, comprising:
    registering a first application executable by the information handling system with the video device manager by placing the first application on a registration list internal to the video device manager;

receiving a request from the first application to access the video device;

providing access to the video device by the first application;

registering a second application executable by the information handling system with the video device manager by placing the second application on the registration list internal to the video device manager, receiving a request from the second application to access the video device; and providing access to the video device in a multi-window environment based upon a system of window visibility rules wherein a determination of access to the video device is based upon a visibility of a first window corresponding to the first application on a single display device and a visibility of a second window corresponding to the second application on the single display device.

15. The method as claimed in claim 14, further comprising the steps of:

determining whether a respective application is registered prior to providing access to the video device by the respective application upon receiving a request from the respective application to access the video device; and denying access to the video device by the respective application if the respective application is not registered.

16. The method as claimed in claim 14, wherein the window visibility rules include when a window corresponding to a respective application is visible to a user, the respective application is provided access to the video device.

17. The method as claimed in claim 14, wherein the window visibility rules include when a window corresponding to a respective application is not visible to a user, the respective application is denied access to the video device.

18. The method as claimed in claim 14, further comprising the step of unregistering a respective registered application upon receiving a release request from the respective registered application.

19. The method as claimed in claim 14, further comprising the steps of:

maintaining a pointer to a previous application upon a subsequent application obtaining access to the video device; and restoring access to the video device to the previous application upon the subsequent application relinquishing access to the video device.

20. A computer readable medium whose contents cause a computer to perform method steps for controlling a video device, the method steps comprising:

providing access in a multi-window environment to the video device to one or more applications executable by an information handling system, wherein each application of the one or more applications has a corresponding window displayable on a single display device of the information handling system; and upon multiple applications of the one or more applications requesting access to the video device, multiplexing access to the video device among the multiple applications via a system of window visibility rules of the corresponding windows as displayed on the single display device of the information handling system.

21. The computer readable medium as claimed in claim 20, wherein the window visibility rules include when a window corresponding to a requesting application is visible on the single display device, the requesting application is provided access to the video device.

22. The computer readable medium as claimed in claim 20, wherein the window visibility rules include when a window corresponding to a requesting application is not visible on he single display device, the requesting application is denied access to the video device.

23. The computer readable medium as claimed in claim 20, further comprising the step of registering an application prior to said providing step.

24. The computer readable medium as claimed in claim 23, further comprising the steps of:

determining whether an application is registered prior to said providing step upon receiving a request from the application to access the video device; and denying access to the video device by the application if the application is not registered.

25. The computer readable medium as claimed in claim 23, further comprising the step of unregistering the registered application upon receiving a release request from the registered application.

26. The computer readable medium as claimed in claim 20, further comprising the steps of:

maintaining a pointer to a previous application upon a subsequent application obtaining access to the video device; and restoring access to the video device to the previous application upon the subsequent application relinquishing access to the video device.

27. An information handling system, comprising:

a processor suitable for performing a program of instructions;

a single display device coupled to the processor, the single display device suitable for providing a display of data;

a video device suitable for providing video data; and a memory device coupled to the processor, the memory device suitable for storing a program of instructions, wherein the program of instructions configures the processor to provide access in a multi-window environment to the video device to one or more applications executable by the information handling system, wherein each application of the one or more applications has a corresponding window displayable on the single display device of the information handling system, and upon multiple applications of the one or more applications requesting access to the video device, configures the processor to multiplex access to the video device among the multiple applications via a system of window visibility rules of the corresponding windows as displayed on the single display device of the information handling system.

28. The information handling system as claimed in claim 27, wherein the window visibility rules include when a window corresponding to a requesting application is visible on the single display device, the requesting application is provided access to the video device.

29. The information handling system as claimed in claim 27, wherein the window visibility rules include when a window corresponding to a requesting application is not visible on the single display device, the requesting application is denied access to the video device.

30. The information handling system as claimed in claim 27, further comprising the step of registering an application prior to said providing step.

31. The information handling system as claimed in claim 30, further comprising the steps of:

determining whether an application is registered prior to said providing step upon receiving a request from the application to access the video device; and denying access to the video device by the application if the application is not registered.

32. The information handling system as claimed in claim 30, further comprising the step of unregistering the registered application upon receiving a release request from the registered application.

33. The information handling system as claimed in claim 27, further comprising the steps of:

maintaining a pointer to a previous application upon a subsequent application obtaining access to the video device; and restoring access to the video device to the previous application upon the subsequent application relinquishing access to the video device.

\* \* \* \* \*